Dec. 9, 1941.　　　V. P. THOMPSON　　　2,265,208
FRACTURE FIXATION MEANS
Filed Feb. 11, 1938
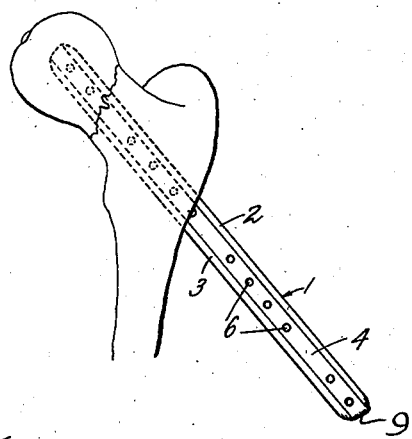
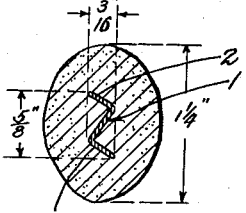
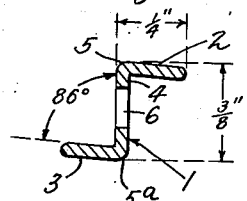
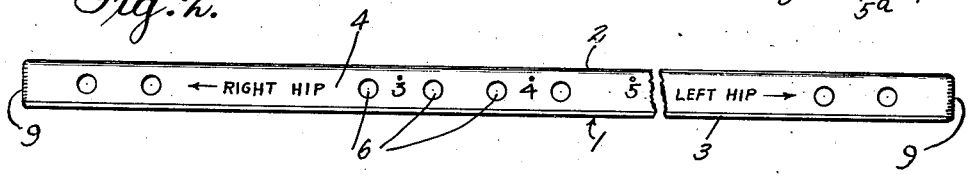
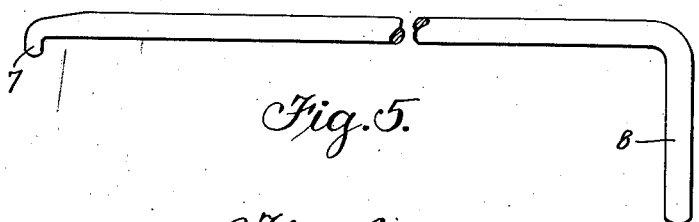
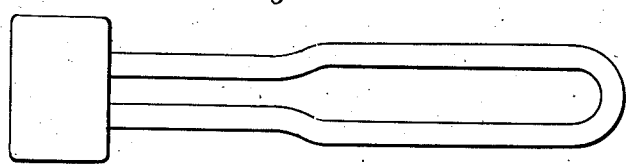
Inventor
Vernon P. Thompson
By Lyon & Lyon
Attorneys Patented Dec. 9, 1941

2,265,208

UNITED STATES PATENT OFFICE 2,265,208

FRACTURE FIXATION MEANS

Vernon P. Thompson, Los Angeles, Calif.

Application February 11, 1938, Serial No. 190,004

7 Claims. (Cl. 128—92)

This invention relates to a fracture fixation means, and more particularly to a metallic, or other suitable material, member of such characteristics as are applicable for use in fixing fractured bones such, for example, as intracapsular fractures of the femoral neck at the hip-joint. While this invention is not limited to the fixation of intracapsular fractures of the femoral neck at the hip-joint, the applicability of the fracture fixation member embodying my invention is best illustrated as used in connection with such a fracture.

The intracapsular fractures of the femoral neck at the hip-joint have often been classified as the most serious of all fractures involving joints. The mortality rate resulting from such fractures is unusually high and the percentage of poor results in the treatment of such fractures is also high.

Many fixation members made of various materials and in various shapes have been used or suggested for the fixation of the fractured bone sections such as wires, drills, rods, screws, round nails, three-flanged nails, carriage bolts, expansion bolts, etc.

In order to properly understand the problems with which this invention deals, it is believed essential to set forth the conditions which such a fracture fixation member should meet in order that it may be successful in use. This likewise involves a consideration of the cause of such fractures. The most common causes of the fracture of the femoral neck at the hip-joint is a twist or a torque stress, or a shear stress by a blow over the greater trochanter as when the patient falls on his side or transmitted up the femur from a fall on the knee or a combination thereof. In rare instances the neck fragments are driven up into the head of the femur, impacting it, holding the head firmly on the neck.

It is generally recognized that if such a fracture is to unite, the fragments must be held together until they knit. In the absence of a natural fixation, internal fixation is often resorted to. The mechanical requirements of such an internal fixation member, or internal splint, are that it must have a high resistance ratio to torque and shear as the fracture and displacement is originally caused by these forces. The internal fracture fixation member or splint must have sufficient structural strength to resist shear and bending moments at the line of fracture due to the natural pull of the large thigh and hip muscles and upon bearing the weight of the body.

The internal fracture fixation member or splint does not have to be formed in such a manner as to be resistant to distraction or separation of the fragments in a longitudinal axis of the femoral neck as the pull of the muscles and of the patient's weight in weight-bearing holds the bones firmly in apposition.

The internal fixation member should be of such size and shape as to approximate, in ratio, the natural dimensions of the femoral neck (Fig. 3), so as to provide uniform clearance about it, cut as few blood vessels as possible, be thin so as to reduce, as far as possible, the tendency to splitting, and yet introduce a sufficient amount of metal to meet the above set forth structural requirements.

As the internal fixation member must be blind-driven to some extent and sometimes wholly so, some means, i. e., calibrations, should be provided in order to permit the gauging, or determination of the proper position of the fixation member longitudinally to the neck, head and joint surface, without the necessity of resorting to calculations for the magnification due to the spreading X-rays used for making the roentgenograms.

In order to permit of the proper positioning of such a fixation member, it should be of indefinite length and so formed as to permit the same to be cut off at the point of emergence of the fixation member from the bone after it is properly positioned, to avoid the unnecessary projection of points, heads, wires, etc., into the flesh, which cause irritation and pain. This avoids the frequent error of improper length when the length of the fixation member must be pre-selected. This further permits, with applicant's fixation member, only one standard length of universal applicability.

It is an object of my invention to provide a fracture fixation means particularly applicable for use in the fixation of the fracture of the femoral neck at the hip, which means is applicable to resist torsional and bending and shearing strains at the line of fracture.

Another object of my invention is to provide a fracture fixation member or means particularly applicable for fixation of the fracture of the femoral neck at the hip, which fixation member or means is of such structural formation as to provide for the resistance to the stresses therein encountered, and which is so formed as to approximate in ratio the natural dimensions of the femoral neck, and which, when placed in position, will result in the severance of as few as possible of the blood vessels, and may be thin, so as to reduce the possibility of splitting the bone, and yet will introduce into the fractured bone a sufficient amount of material of such structural conformation as to meet the requirements to resist torsional shearing and bending stresses.

A further object of my invention is to provide markers or calibrations on the fixation member, demonstrable by the means of roentgenograms when within the bone, and similarly spaced markers visible to the eye on that portion of the fixation member projecting without the bone. Moreover, such markers, if apertures, may provide means of extracting the fixation member by a hook, even though the fixation member be cut off flush to the bone, since the small hook may be inserted within the bone.

Other objects and advantages of this invention it is believed will be apparent from the following detailed description of a preferred embodiment thereof as illustrated in the accompanying drawing.

In the drawing:

Figure 1 is an antero-posterior elevation of the upper femur at the hip-joint illustrating a fixation member embodying my invention as positioned therein to fix a fracture of the femoral neck thereof.

Figure 2 is a detached elevation of a fracture fixation member embodying my invention.

Figure 3 is an end elevation thereof within the constructed portion of the neck of the femur.

Figure 4 is an end elevation thereof with the approximate dimensions found useful.

Figure 5 is a view of an extractor utilized in connection with my invention.

Figure 6 is a view of the positioning or extracting hammer likewise utilized in connection with my invention.

The fracture fixation member embodying my invention is preferably formed of No. 302 stainless steel since this material is of non-irritating, non-corrosive characteristics in body tissues. Its cross section is preferably of Z or S shape and its length is such as to more than provide for the longitudinal length of the fixation member as may be required in the fixation of such a fracture, the excess projecting conveniently for driving and serving as a handle for manipulation, thus dispensing with extraneous members.

The fixation member 1, as illustrated in the accompanying drawing, is generally of Z shape and is preferably formed from 20-gauge No. 302 stainless steel. The two lateral flanges 2 and 3 which extend from the central connecting web 4 are formed by die-pressing. The ribs formed at the angles 5 and 5a with the connecting flanges provide the essential rigidity to the member.

The average diameters of the femoral neck are $\frac{7}{8}''$ x $1\frac{1}{4}''$. The dimensions of the fixation member embodying my invention are thus to some extent fixed by the dimensions of the femoral neck, the dimensions being such that the same amount of bone is present upon all sides of the nail. Therefore, for average use, the limitations of the size of the nail are approximately $\frac{5}{8}''$ x $\frac{3}{16}''$; hence, the dimension across the connecting web 4 is approximately $\frac{3}{8}''$ and the lateral extent of the flanges 2 and 3 is approximately $\frac{1}{4}''$; in other words, the dimensions of the fixation member are in proportion to the lesser transverse diameters of the bone through which the fixation member is to be passed into the head.

In order to determine the position of the fixation member in the bone at definitely positioned intervals along the length of the nail, the central web is perforated as indicated at 6, the particular perforations as illustrated in the drawing being at $\frac{1}{2}''$ centers and being grouped along the length of the nail in such groups as may be easily identified in a roentgenogram. As a positive identification of the actual depth of insertion, numbers and characters are stamped along the web of the fixation member.

In the fixation of fractured bones by the use of such fixation members, the position of the fixation member is usually determined by the use of the X-ray. As the X-ray, depending upon its particular position and characteristics, has a magnifying characteristic, it is not possible to accurately determine from such roentgenograms the position of the fixation member in the joint without the use of some known standard by which the magnification may be easily determined. For example, the position of such fixation member within the bone may be progressively determined as it is driven into position. The first of such roentgenograms will show generally that the fixation member must be driven further into the bone structure. As, however, the roentgenogram is a magnification view, it would not be possible to determine how much farther the fixation member should be driven without resorting to difficult mathematical calculations, depending upon a number of factors. By the use of the definitely spaced apertures 6, which are known to be on $\frac{1}{2}''$ centers, the physician or surgeon positioning the fracture fixation member may, upon mere observation of the roentgenogram and by visible comparison of the distance between the centers of the apertures 6 which are known to be $\frac{1}{2}''$, determine how much farther the fracture fixation member should be driven in order to be properly positioned.

As illustrated in the drawing, the fracture fixation member is generally formed of approximately 10'' in length, and the apertures 6 are generally grouped into three groups of apertures. Toward the inner end is a group of two apertures, notches or calibrations demonstrable by roentgenography; nearer the middle, a group of four or more as necessary for purposes of measurement and extraction by a hook; and in the outer portion, a group of one or more apertures for purposes of extraction or extraction and measurement should the remainder of a used fixation member be further positioned as another fixation member.

The flanges 2 and 3 are preferably die-pressed to an angle of the central web of slightly less than 90° and preferably to about an 86° angle. The ribs thus formed by three flanges at less than right angles to each other give for the same amount of material a marked rigidity and bending resistance and at the same time provide a long torque radius. The special shape as to cross-section is of great value in giving holding power with minimal splitting tendency.

After the fixation member 1 has been driven into the femoral head illustrated in Figure 1, the projecting end thereof can be cut off by the use of shears or the like and the ends of the fixation member at the cut may be turned over to prevent the irritation of sharp points projecting into the flesh, and likewise to serve as an additional means of fixing the fracture member in position.

If, during or after the insertion of the fracture member into the bone, it becomes desirable at any time to remove the same or to extract the same, the extraction member as illustrated in Figure 5 may be employed.

The extractor member shown in Figure 5 includes a rigid, steel rod, ground to a round point and bent on itself at one end as a point 7 for insertion through the hole in the fixation member and bent at a right angle at the other end to provide an arm 8 to hammer on. A sleeve or clamp about the extractor and fixation member may be employed to prevent the hook from pulling out of the hole in the fixation member.

In order to facilitate the driving of the fracture fixation member into the bone, one or both ends of the fracture fixation member embodying my invention are preferably sharpened, as indicated at 9.

A further instance of the need for a torque controlling, internal fixation member is shown by a common fracture of the outer half of the distal end of the humerus. The forearm muscles are attached to the upper and outer portion of the distal fragment, rotating it forward nearly 90° or more. Should an ordinary means of internal fixation, such as a round nail, be used, the fragment is still free to rotate on the internal metallic fixation means as on an axle. By means of a similar but smaller metallic internal fixation member, as described, shear and torque are effectively controlled. Similar problems requiring similar means of internal fixation arise at the humeral epicondyles, the malleoli at the ankle, the small bones of the wrist, and other locations.

Since in the application of the Z cross-sectioned nail to the more superficial fractures, calibrations and special means for extraction are not always necessary, the mechanical advantages of the high torque, shear and bending resistance of the two-ribbed, three flanged fixation member are the points of special applicability. Similarly, should the physician or surgeon choose to forego the special advantage, even in fractures of the hip, of the universal length of this fixation member, a head may be formed on the two-ribbed, three-flanged, Z cross-sectioned fixation member of definite length, with which a handle may be set for purposes of positioning and extraction.

Having fully described my invention, it is to be understood that I do not wish to be limited to the details herein set forth, but my invention is of the full scope of the appended claims.

I claim:

1. A fracture fixation member comprising an elongated member of metal or other suitable material, including a central connecting web having at its opposite edges oppositely turned flanges.

2. A fracture fixation member of metal or other suitable material of elongated form and of substantially Z cross-section.

3. A fracture fixation member comprising an elongated form of metal or other suitable material having a central web with oppositely turned flanges at its edges, and one of its sections thereof having a perforated section, the perforations of which are positioned at definite intervals along the length thereof.

4. A fracture fixation member of metal or other suitable material of substantially Z cross-section, the central web of which is perforated at definite spaced intervals along the length thereof.

5. A fracture fixation member comprising an elongated member of a material of non-irritating, non-corrosive characteristics in body tissue, said member including a central connecting web having at its opposite edges oppositely turned flanges, the cross sectional shape of which is such as to oppose torsional strains and such as to minimize coring or reaming action.

6. A fracture fixation member comprising an elongated member of a material of non-irritating, non-corrosive characteristics in body tissue, said member including a central connecting web having at its opposite edges oppositely turned flanges, the cross sectional shape of which is such as to oppose torsional strains and such as to minimize coring or reaming action, and one of its sections thereof having spaced perforations of such size and position for fixation of the fracture member within a bone through the growth of bone through said perforations.

7. A fracture fixation member comprising an elongated member of a material of non-irritating, non-corrosive characteristics in body tissue, said member including a central connecting web having at its opposite edges oppositely turned flanges, the cross sectional shape of which is such as to oppose torsional strains and such as to minimize coring or reaming action, and the perforations of which are of a size and are so positioned as to facilitate partial or complete extraction of the fracture member as it lies wholly within the bone.

VERNON P. THOMPSON.